United States Patent [19]

Cina

[11] Patent Number: 5,322,225
[45] Date of Patent: Jun. 21, 1994

[54] PROCESS OF RECYCLING OF DISPOSABLE DIAPERS AND THE MACHINE COMPONENTS THEREOF

[75] Inventor: Yaron Cina, Tel-Aviv, Israel

[73] Assignee: Diatec Recycling Technologies Ltd., Ramat Hasharon, Israel

[21] Appl. No.: 886,899

[22] Filed: May 22, 1992

[30] Foreign Application Priority Data

May 23, 1991 [IL] Israel ............... 098229

[51] Int. Cl.⁵ ............................... B02C 19/12
[52] U.S. Cl. ......................... 241/14; 241/21; 241/38; 241/77; 241/DIG. 38
[58] Field of Search .............. 241/14, 21, DIG. 38, 241/38, 77

[56] References Cited

U.S. PATENT DOCUMENTS

| | | | |
|---|---|---|---|
| 3,645,456 | 2/1972 | Grafstrom et al. | 241/29 |
| 3,807,296 | 4/1974 | Eck | 100/74 |
| 4,303,501 | 12/1981 | Steffens | 209/2 |
| 4,500,040 | 2/1985 | Steffens | 241/14 |
| 4,592,115 | 6/1986 | Holmstrom | 19/82 |
| 4,990,244 | 2/1991 | Anderson | 209/2 |
| 5,104,047 | 4/1992 | Simmons | 241/20 |
| 5,197,678 | 3/1993 | Trezek et al. | 241/21 |

FOREIGN PATENT DOCUMENTS

| | | |
|---|---|---|
| 2703063 | 7/1978 | Fed. Rep. of Germany . |
| 2704035 | 8/1978 | Fed. Rep. of Germany . |
| 3214294 | 1/1984 | Fed. Rep. of Germany . |
| 8303765 | 1/1985 | Sweden . |

Primary Examiner—Timothy V. Eley
Assistant Examiner—John M. Husar
Attorney, Agent, or Firm—Browdy and Neimark

[57] ABSTRACT

A process and machine components, intended to be used for recycling cellulose and plastic components of disposable diapers and other non woven cellulose articles to be utilized as basic raw materials, using splicing of the diapers and cellulose articles; separating the spliced mass into a plastic stream and a cellulose stream; disposing said plastic stream; disintegrating said cellulose stream into water, and separating said cellulose flock from the superabsorbent polymers and other waste effluent included in said cellulose stream; disposing off said superabsorbent polymers and waste in said water effluent; and compacting said separated cellulose flock prior discharge.

29 Claims, 17 Drawing Sheets

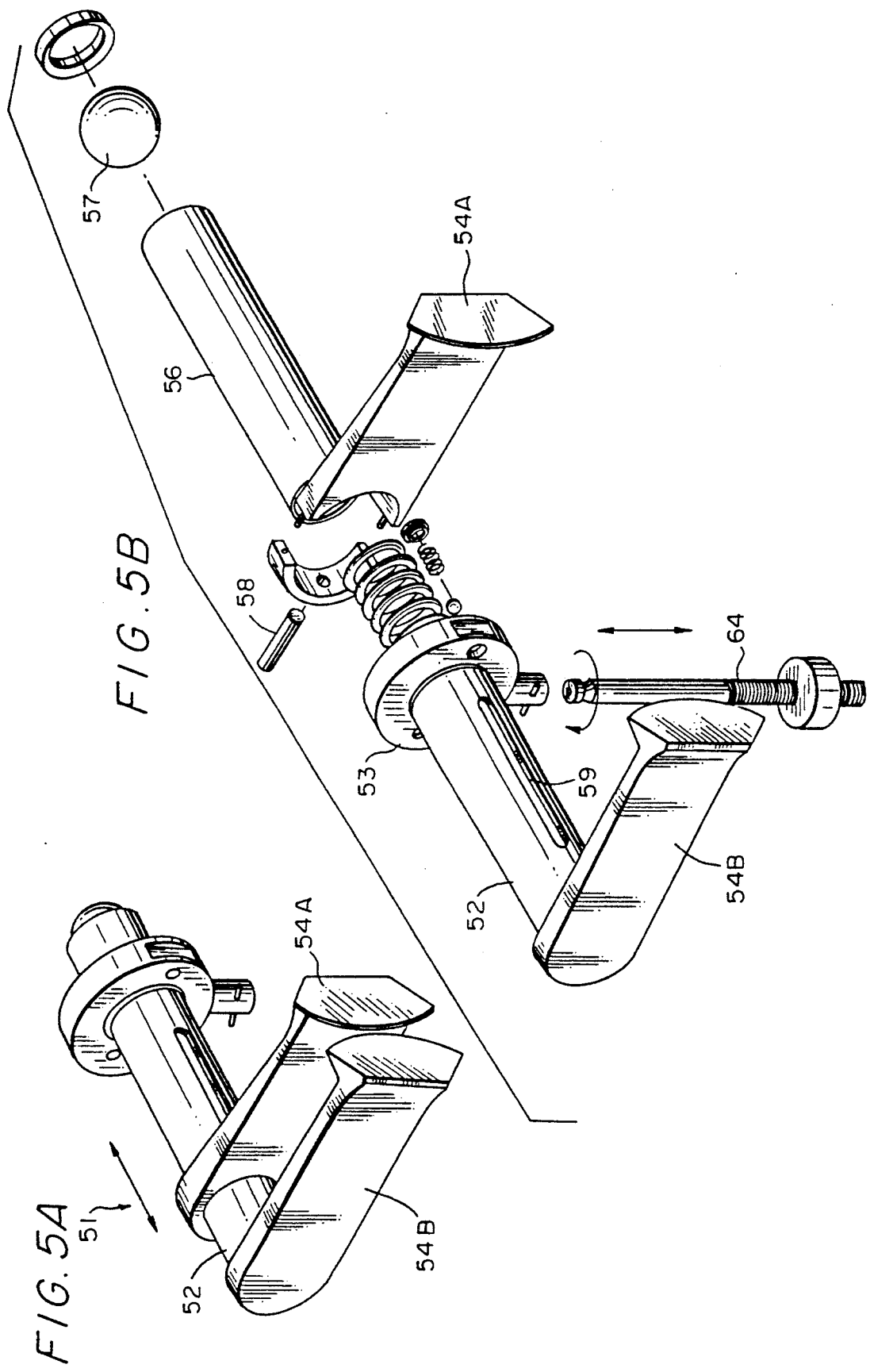

FIG. 6C(1)
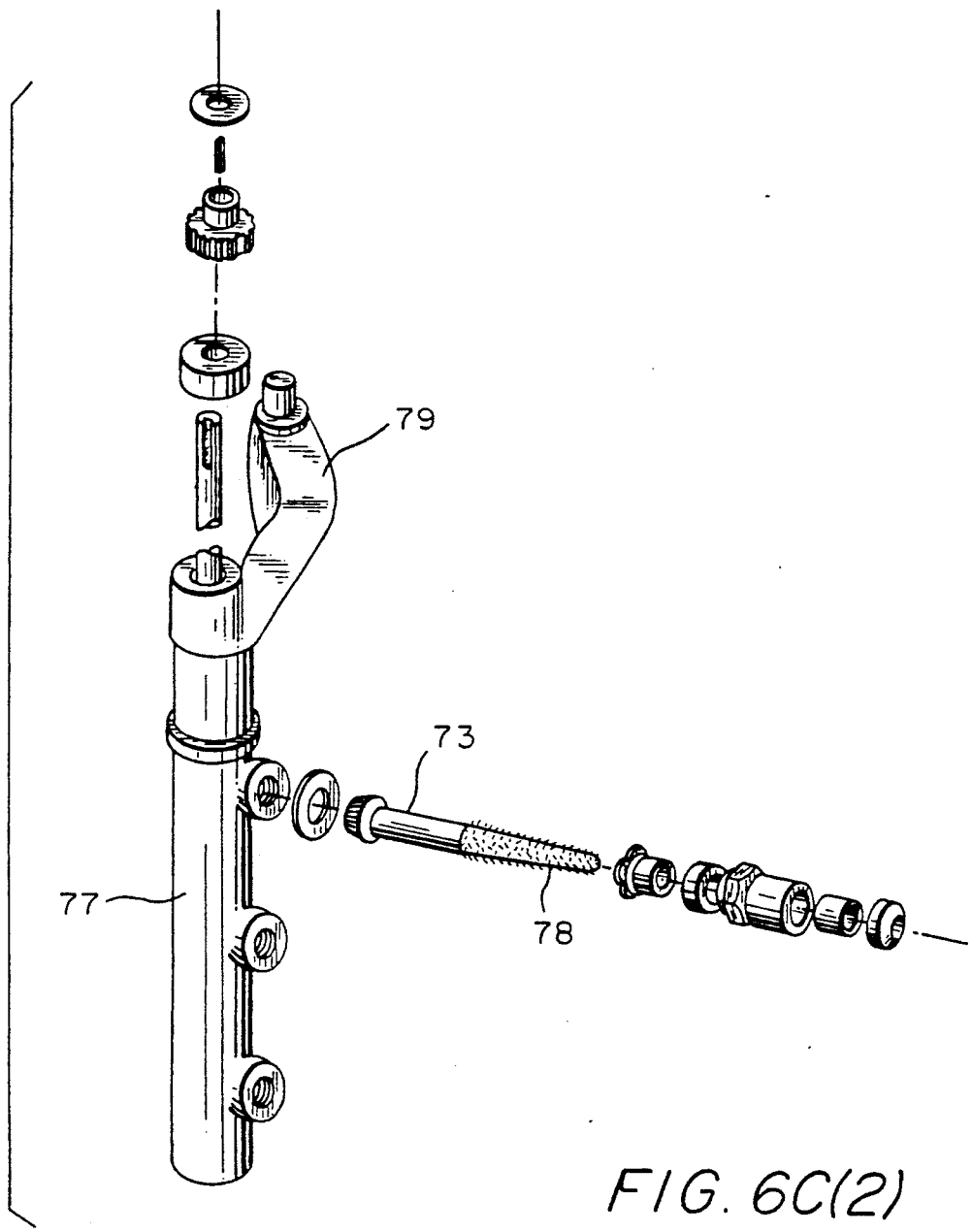
FIG. 6C(2)
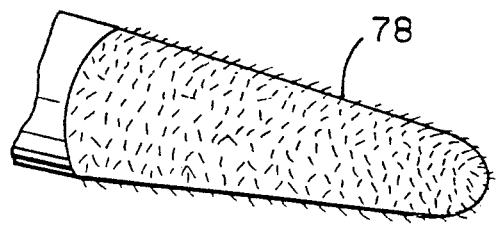

PROCESS OF RECYCLING OF DISPOSABLE DIAPERS AND THE MACHINE COMPONENTS THEREOF

BACKGROUND OF THE INVENTION

This invention relates to processes of garbage recycling and to machines for that purpose; more particularly, to a process and machines for processing and producing products from disposable diapers and other non woven cellulose articles to be used as basic raw materials, such as compacted cellulose, and plastics.

DESCRIPTION OF THE PRIOR ART

The eccological impact of disposable diapers and other similar cellulose articles such as sanitary towels, panties, sick-bed undersheets and other hygiene products requires efficient processes to decompose the contents of these articles and to separate the components to be recycled in an economical way. This invention is particularly aimed at recycling of disposable diapers and separating the cellulose contents into a dry and compact product, and the plastic component into a reusable raw material.

A child from his birth till the age of 30 months uses approximately 6 disposable diapers a day. Each of the diapers has an average volume of 500 cc. Thus one child produces on average 3000 cc of garbage a day, i.e. 21 liters a week and thus 1.092 cubic meters per year. There are about 50,000 diaper users per million population, so that during one day it is necessary to remove from a city of one million inhabitants 150 cubic m of that kind of garbage.

Different attempts have been made to solve the problem of recycling of disposable diapers, napkins, hospital bed sheets, sanitary towels and other similar products. All these cellulose containing articles have the same structure: an envelope of a non woven tissue, a plastic or rubber cover material, a cellulose-flock filling mixed in most cases with superabsorbent polymers which can absorb liquid up till 400 times their own volume.

The main idea is to recover the cellulose, it being the most valuable raw material, and to recover the plastic cover material which is an ecological hazard. Most of the patents existing in the prior art suggest one common process of separating of the cellulose from the other materials of the rejected hygiene articles.

The following patents: DE 2704035, EP 91982, SE 8303765, DE 3214294, DE 2703063 describe processes including the following basic operations: disintegrating (shredding, cutting) of the disposed articles, and then separating the cellulose fibres from the covering elements by sieving.

DE 2704035 stipulates that the cellulose fibers can be separated from the non-cellulose materials by dry sieving in one or more stages.

Other patents describe the mode of separation of the cellulose from the non-cellulose cover components by using a machine (such as a perforated drum), creating suction on the drum surface and separating the cellulose mass. These patents describe the suction means using ambient air.

U.S. Pat. No. 4,592,115 describes a perforated cylindrical separator for separation of cellulose fibers. The separator is provided with perforations large enough to permit the cellulose fluff fibers to pass through, but small enough to screen out larger non-fluff materials from the waste fibrous material. The balance between the air flow rate and the differential pressure across the separator is sufficient to prevent blockage of the apertures in the separator by the waste fibrous material and to achieve the purpose of separation between the cellulose and non-cellulose materials.

Several specific units for recycling of disposable diapers are described in the above mentioned references.

SE 8303765 suggests a pneumotransporter for transporting the diapers on to a cylindrical perforated separator having an upper inlet and two lower outlets for releasing the waste products.

DE 3214294 describes the shredding of the diapers by rotating entrainers, which are arranged in an enclosed housing. The cellulose flock thus separated is removed from the housing under suction through a sieve. The shredded cover material is then removed separately.

EP 0180696 describes an apparatus in which a disintegrated material suspension is introduced tangentially into a separator, comprising a cylindrical housing having one inlet and two outlets. The cellulose separation is achieved by a perforated separation drum and air suction means, provided by a fan.

U.S. Pat. No. 3,807,296 describes an apparatus for disposing of waste materials, wherein the waste materials are separated for either compacting or discharge into a sewage system. Prior to discharge, a portion of the waste products are crushed and stored in a container provided in the apparatus, which container is connected to the sewage system. The remaining portion of the waste materials or the non-decomposable waste material is separated in another compartment from that being crushed, so that it may be compacted and disposed of or forwarded to an appropriate treatment facility for possible recycling. However, recycling of the waste materials is not mentioned in this invention.

U.S. Pat. No. 4,303,501 describes a process for the continuous separation of discarded hygiene articles into their components, namely flock and/or cut absorbent materials on the one hand and sheet coverings on the other, comprising first tearing the discharged hygiene articles into large pieces and then conducting such pieces over an oscillating sieve surface, preferably over an oscillating sieve device having decreasing mesh widths with the smallest mesh width being so selected that the flocculent and/or cut absorbent material still can fall through while the large pieces of torn coverings are always carried off as sieve residues. It should be noted that no separation and disinfection of the flock stream is provided.

However, the main problem of the cellulose recycling from disposable diapers is not the separation from the elastic or tissue covers, but the separation of the cellulose media from the superabsorbent polymers incorporated in the diaper flock.

All the above described processes are relatively, complicated, because they require installations having sieves, compressed and heated air, and therefore can be utilized only for large quantities of diaper garbage.

The second disadvantage of these processes is that the separation process of the cellulose fibres from the superabsorbent polymers is not resolved effectively.

The third disadvantage is that the processes described above provide disintegrated cellulose and plastic, which cannot be used as such for further processing.

The machine components used in the above mentioned processes have the corresponding disadvantages: complexity, high cost, not usable in conventional dwellings. No safety means are provided for introduction of the diapers into the processing machine to guard the user when introducing the disposed item. Moreover, no means are suggested for transformation of the disintegrated diaper parts into raw materials for further use.

OBJECTS AND SUMMARY OF THE INVENTION

It is the purpose of the present invention to provide a process for recycling cellulose and plastic components of different disposable hygienic cellulose articles which can be utilized for conventional dwellings; and machine components thereof.

The process and the machine components, herein provided, is intended to be used for recycling cellulose and plastic components of disposable diapers and other non woven cellulose articles to be utilized as basic raw materials, using splitting of said diapers and cellulose articles; separating said split mass into a plastic stream and a cellulose stream; and disposing of said plastic stream; and disintegrating said cellulose stream into water, and separating said cellulose flock from the superabsorbent polymers and other waste effluent included in said cellulose stream; and disposing off said superabsorbent polymers and waste in said water effluent; and compacting said separated cellulose flock prior to discharge.

In the preferred embodiment said process provides moistening of said split diapers and cellulose articles before separation of said split mass into said plastic stream and said cellulose stream.

In the preferred embodiment said process provides separation of said cellulose flock from said superabsorbent polymers and other waste included in said cellulose stream by collecting said cellulose fibers onto a rough surface.

In the preferred embodiment said separation process of said cellulose from said waste materials is provided in a solution of a disinfectant in water.

In the preferred embodiment said process provides compacting of said separated cellulose flock by compressing and simultaneous drying and disinfection of said wet flock.

In the preferred embodiment said plastic stream is compacted prior to disposal.

In the preferred embodiment said compacting process of said plastic stream is performed by melting, and then cooling.

In an alternative embodiment said compacting process of said plastic stream is performed by compressing and heating.

In the preferred embodiment said machine components comprise a lid for introducing safely said diapers and said disposed cellulose articles into said machine; and splitting means for splitting said diapers and cellulose articles; and a separating and compacting unit of said plastic stream; and a water basin into which said cellulose stream is introduced; and a collecting unit of said cellulose flock from said water basin; and a unit for compacting of said cellulose flock; and disposal means for removal of the liquid effluent in said water basin.

In the preferred embodiment said separating and compacting unit of said plasic stream is provided with melting and cooling means.

In an alternative embodiment said unit for compacting of said cellulose flock serves in turns also for compacting of said plastic stream.

In the preferred embodiment said safety lid for introducing said diapers and said disposable cellulose articles into said machine, comprises a cylindrical body having an orifice through which said diapers and cellulose articles are introduced; and said cylindrical body is attached to a pedal by connecting means, also providing raising, and turning means, thus enabling said lid to rise over said machine housing when said diaper or cellulose article is introduced into said orifice, and then return into said machine housing and turn around simultaneously in order to protect the user's hand from any movable parts.

In the preferred embodiment said splitting means are placed under said lid and comprise a circulating continuous saw.

In the preferred embodiment said splitting means comprise a flexible frusto-conical guide tube for transferring said diapers from said lid towards said circulating continuous saw; and the smaller orifice of said conical tube is faced towards said saw.

In the preferred embodiment said separating and compacting unit of said plastic stream comprises movable clips for holding the plastic cover parts of said diaper and said cellulose articles; and said clips tear said plastic covers away from the cellulose stream, and transfer said plastic stream into a conical hollowed element for further compacting and discharging.

In one embodiment said hollowed element is heated, and said plastic melts and is then cooled, compacted and discharged.

In the preferred embodiment said movable clips are provided with means for opening, closing, and moving up and down over said water surface in said basin so that during the separation process of said plastic stream from said cellulose stream moisture is provided to said cellulose stream.

In the preferred embodiment said movable clips comprise a support tube, having two grips, one of them being movable; and said support tube is provided inside with a spring, connected to said movable grip; and provided with a movable cylindrical body, having at the outer end a rotatable ball, and said means comprise an inclined wall having three sections of different thicknesses, and driving means for the vertical movement of said clips, so that when said clips are driven downwards, said ball rolls along said wall sections, and presses said cylindrical body; and said cylindrical body causes compression of said spring, thus closing said grips, and grabbing a part of said diaper or said other cellulose article; and when said driving means drive said closed clips up and down along one of said surfaces, while moisture is provided from said basin on to said cellulose.

In the preferred embodiment said collecting unit of said cellulose flock from said water basin comprises a rotatable element provided with rotatable pins having rough surfaces; and having a corresponding rotatable doffer, provided with slots for unloading said cellulose flock from said pins, so that when said rotatable pins are loaded with said cellulose flock, said rotating pins interact with said slots of said doffer to release said cellulose flock from said pins, and said cellulose flock is discharged towards said compacting unit.

In the preferred embodiment said pins are covered with small hair-like filaments, such as VELCRO ™-like hair cover.

In an alternative collecting unit of said cellulose flock from said water basin an abrasive nonwoven fabric such as SCOTCH BRIGHT ™ is provided; and said abrasive fabric is moved in said water basin and cellulose flock builds up on said moving rough surface and is then unloaded and discharged.

In an alternative embodiment said cellulose flock collecting unit comprises a rotatable cylindrical brush; a coaxial slotted cylinder embracing said brush; and scrapping means; and said brush can be immersed and rotated in said water basin for removing said cellulose flock from the water onto said brush's bristles; and said brush can be raised from said water basin for unloading said cellulose flock from said bristles.

In the preferred embodiment said bristle's elements are mounted on said brush's base in acute angular means to said base's surface; and said slotted cylinder is rotatable and movable with said rotatable brush; so that when said slotted cylinder rotates together with said brush in said water basin, said brush bristle's elements extend out of said cylinder through said slots and collect said cellulose flock from said water basin; and when said brush and cylinder are raised from said water basin, said brush rotation is stopped while said cylinder continues to rotate thus causing said brush to confine inside said slotted cylinder; and said cellulose flock remains on said cylinder's external surface to be further removed by scrapping means.

In the preferred embodiment said scrapping means are in form of an additional coaxial cylinder, provided with a flexible strip and movable relatively to said slotted cylinder.

In an alternative embodiment said scrapping means are in form of a movable flexible ring.

In an alternative embodiment said brush is able to rotate at two different rates; and said coaxial slotted cylinder has a diameter larger than the diameter of said brush; so that when said brush rotates slowly while being immersed in said water basin, said bristles collects said cellulose flock from said water; and when said brush is raised from said water basin and is rotated faster, said cellulose flock together with the water drops are centrifuged away from said bristle towards the internal surface of said slotted cylinder; and said cellulose flock is scrapped off from said internal slotted cylinder's surface.

In the preferred embodiment said compacting unit of said cellulose flock comprises a rotatable screw feeder; and when said cellulose flock is compacted by said screw means, elevated temperature is created thus providing disinfection and drying of said cellulose flock, prior discharge.

In the further preferred embodiment said rotatable screw feeder is provided with heating means enabling said feeder to compact and disinfect in turn (one after the other) both said cellulose flock and said plastic stream.

In the preferred embodiment said separated superabsorbent polymer and waste effluent remaining in said water basin after said cellulose flock has been separated is pumped away into the sewage system by pumping means; and consequently fresh water is introduced into said water basin.

In the preferred embodiment a blower is provided, creating suction for pneumatically transferring of said cellulose articles and their components from one of said units to another.

Two designs of the machine are considered, one for treating mass cellulose articles to be installed in hospitals, nurseries, or in community centers; the other will be a more compact and cheaper unit to be installed in private homes for a family use. The second smaller unit may not be required to have a plastic processing unit as elaborated as the one described.

BRIEF DESCRIPTION OF THE DRAWINGS

The invention can be best understood by the aid of the drawings attached.

DETAILED DESCRIPTION OF THE PREFERRED EMBODIMENTS

Figure 1:
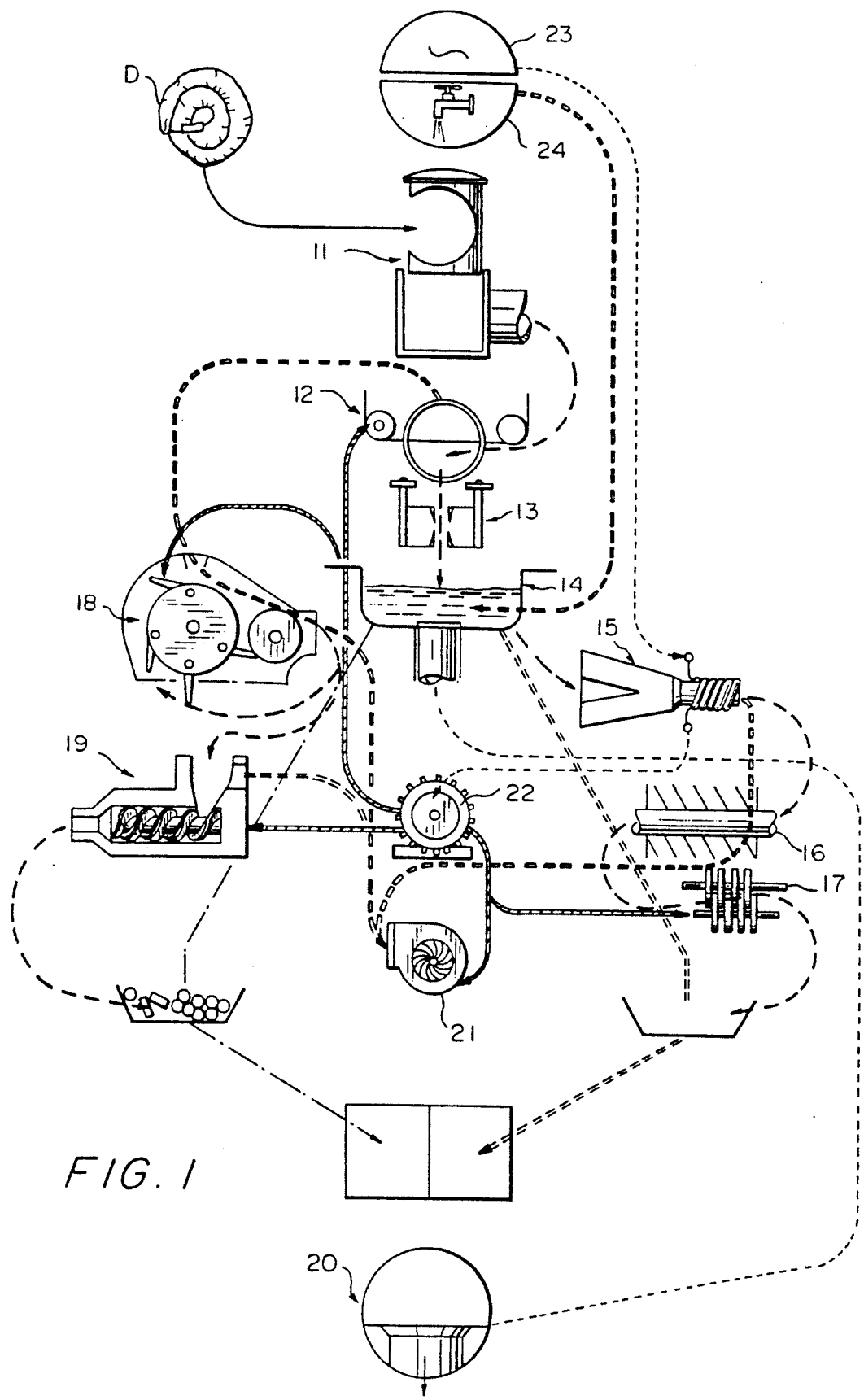
FIG. 1 illustrates a block-diagram of the process described.

In FIG. 1 one can see the main sequence of operations of the process; these operations are performed by the major machine components.

The disposable diaper D or any non woven cellulose article is introduced into the machine through a safe lid unit 11. Then the diaper is split by a saw illustrated in unit 12. The two parts of the diaper are held by clips 13, which move up and down over the surface of water or a solution containing a disinfectant in a water basin 14, the diaper parts are moistened and separated into two streams: a cellulose and plastic stream. The plasic stream is then removed to a melting element 15 from where the melted plastic is transferred to a cooling unit 16 and then to a discharging and compacting unit 17, which includes a shredding device.

The cellulose stream, separated from the diaper, disintegrates in the water basin 14, where the superabsorbent polymers and waste effluents are carried away by the water; the cellulose flock is collected by a collecting unit 18, which comprises rotating pins and a doffer; and the liquid effluent is pumped away from the water basin 14 to the sewage system 20, while fresh water is consequently added into the water basin 14. The moistened cellulose flock, separated in unit 18, is compacted by a compacting unit 19, which comprises a screw and provides compression, disinfection and drying of the cellulose flock before discharging.

A blower 21 is provided to create suction into all the operational units (the blower connections are shown by light cut double lines). An electric motor 22 is provided to drive all the moving parts of all the operational units (the motor connections are shown by thick double lines) Conventional sources of electricity 23 and water 24 are indicated by their schematic connections. Dark cut lines show the sequence of the process operations, performed by the specific units. In other embodiments of the process some units could be ommited or differently designed.

Figure 1A:
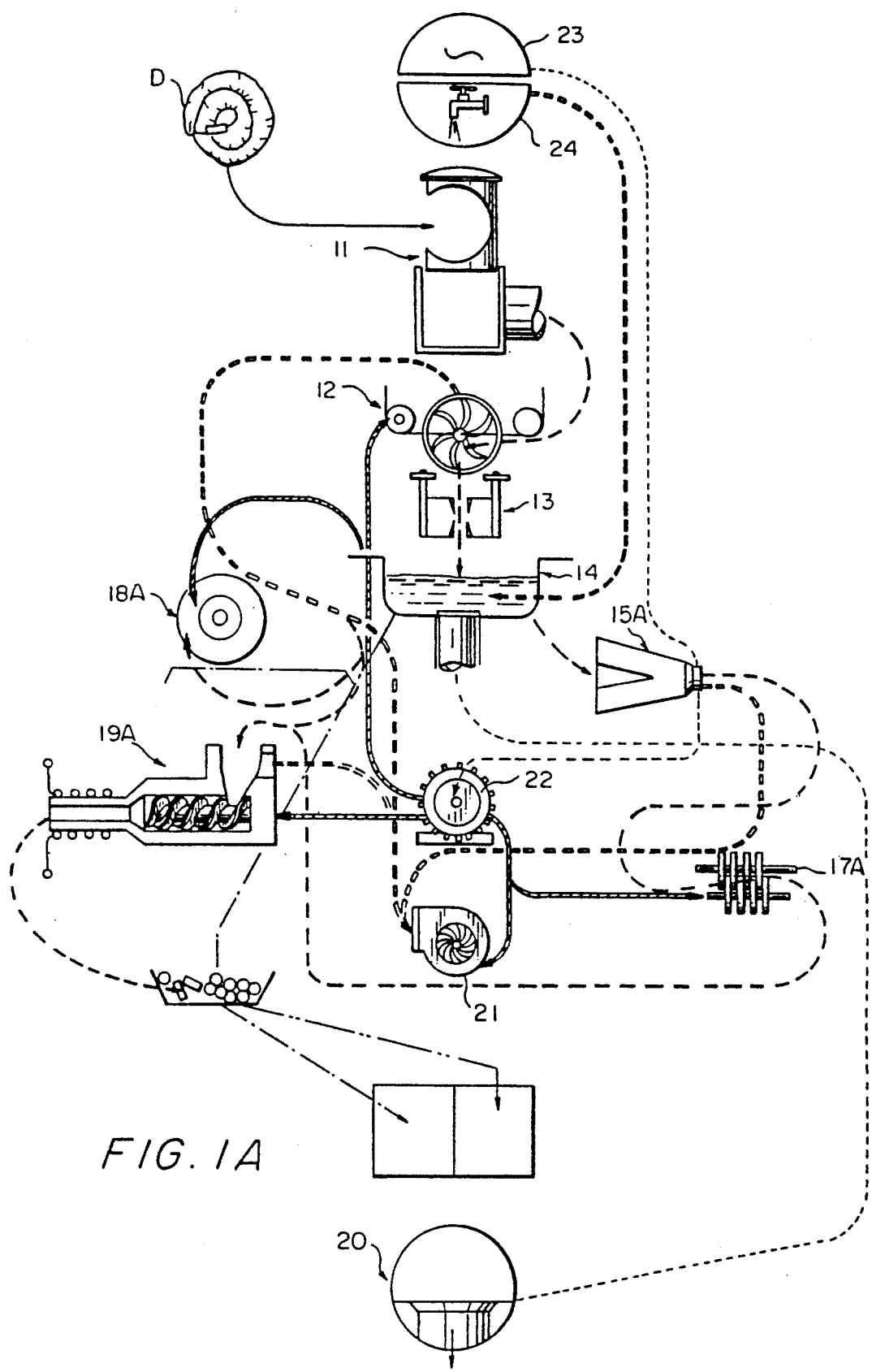
FIG. 1A illustrates a modification of the block-diagram shown in FIG. 1.

In FIG. 1A one can see that several operations of the process in the final step are changed, and some machine components are modified (15A, 18A, 19A) and unified (19A). The plastic stream passes through the conical non-heated receiver 15A and is then shredded by a shredding unit 17A and directed by suction to the compacting unit 19A. The unit 19A is provided with a heating element and is intended to compact and disinfect the cellulose flock and the plastic stream in consequent operations.

Figure 2:
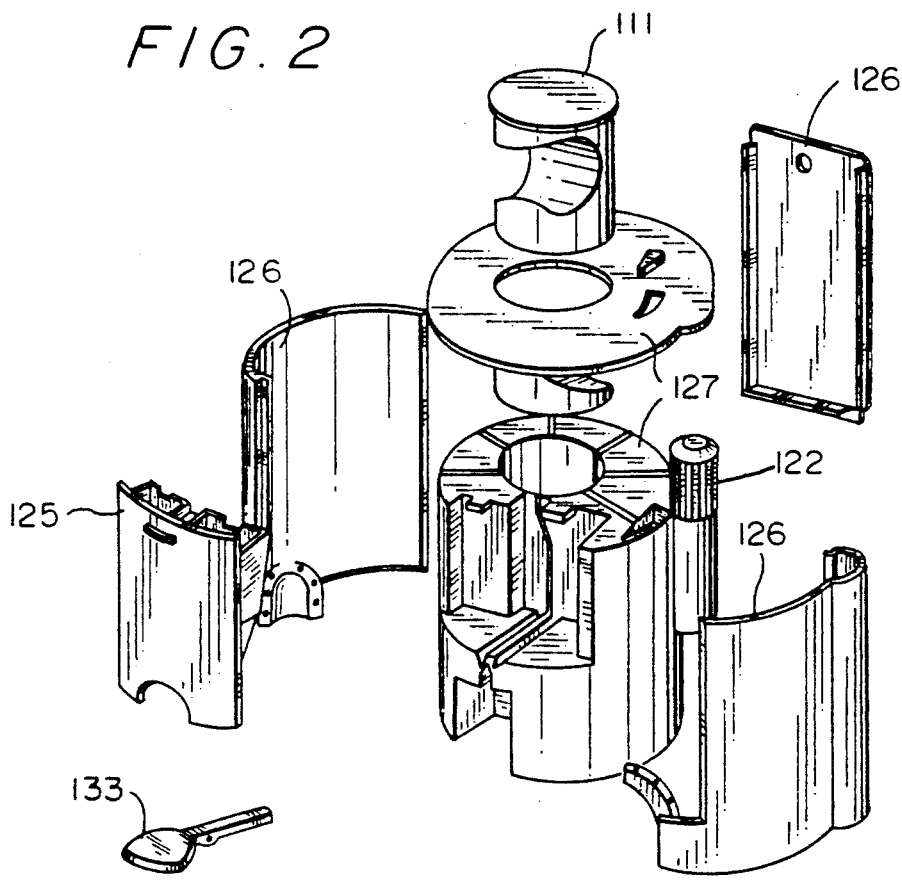
FIG. 2 illustrates a general isometrical view of a family-use machine accomplishing the process described.

In FIG. 2 one can see a general view of the family-use machine, accomplishing the process described above. A safety lid 111, a motor, a motor 122, a pedal 133, discharging reservoirs 125 for cellulose and plastic obtained in the separation process, cover housing panels 126 and the main core body 127 including the splitting unit, the plastic and cellulose separating units, the water basin, and the cellulose and plastic compacting units of the machine (not indicated in detail).

Figure 3:
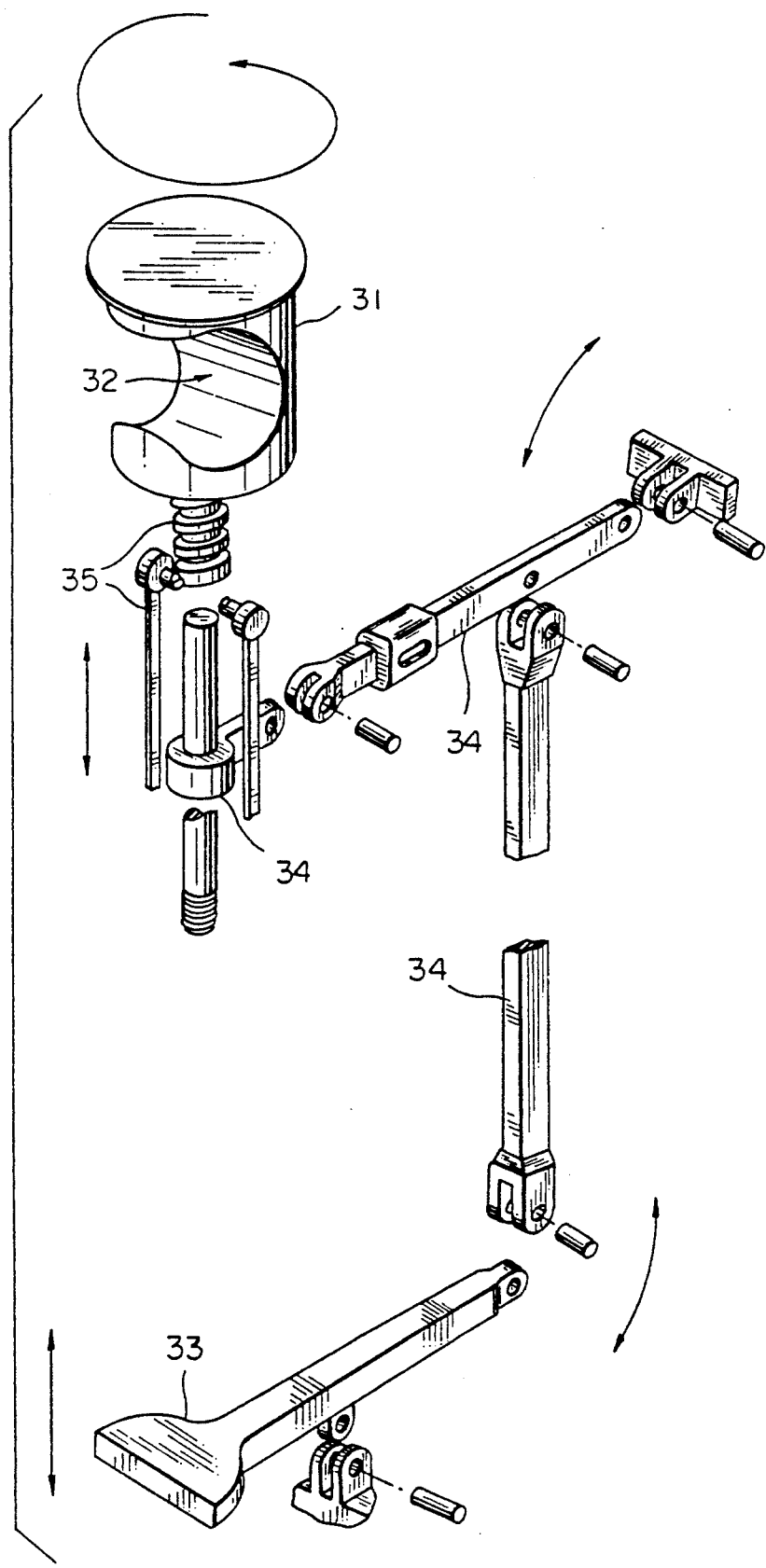
FIG. 3 illustrates a safe lid unit and its components.

In FIG. 3 the safe lid unit comprises a cylindrical lid 31, having an orifice 32, and the lid 31 is attached to a pedal 33 by a connecting mechanism, which includes raising means 34 and turning means 35. The diaper or any other cellulose article may be introduced into the orifice 32, when the lid 31 is raised by the movable connecting levers of the means 34, applied by the pedal 33. After loading the diaper, the lid 31 turns towards the entry of the splitting unit (not seen) of the machine to unload the diaper and simultaneously the entry orifice 32 is turned by means of the screw 35 to protect the user's hand from any movable parts of the machine.

FIG. 4 illustrates a top view and a side view of the splitting unit, having a circulating continuous saw 41, rotating around two wheels 42, one of which is driven by a gear wheel 43. The saw 41 is located at the outlet position 44 of the lid unit described in FIG. 3 above.

Figure 4A:
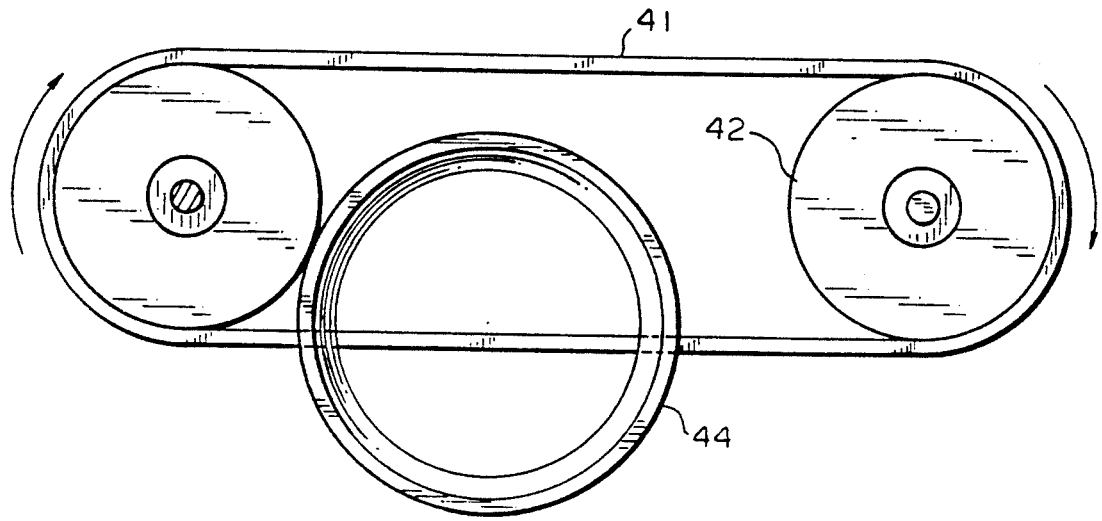
FIG. 4A, B illustrates splitting means in form of a circulating continuous saw.
Figure 4B:
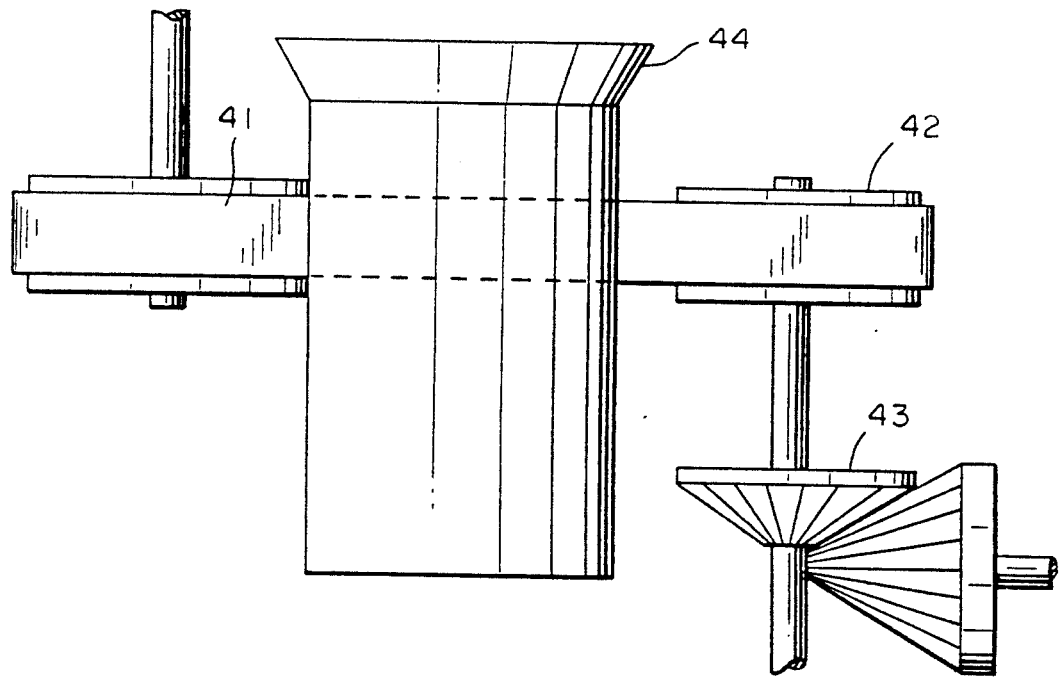
FIG. 4C, D illustrates the splitting means, shown in FIG. 4A, B provided with an additional guide means.
Figure 4C:
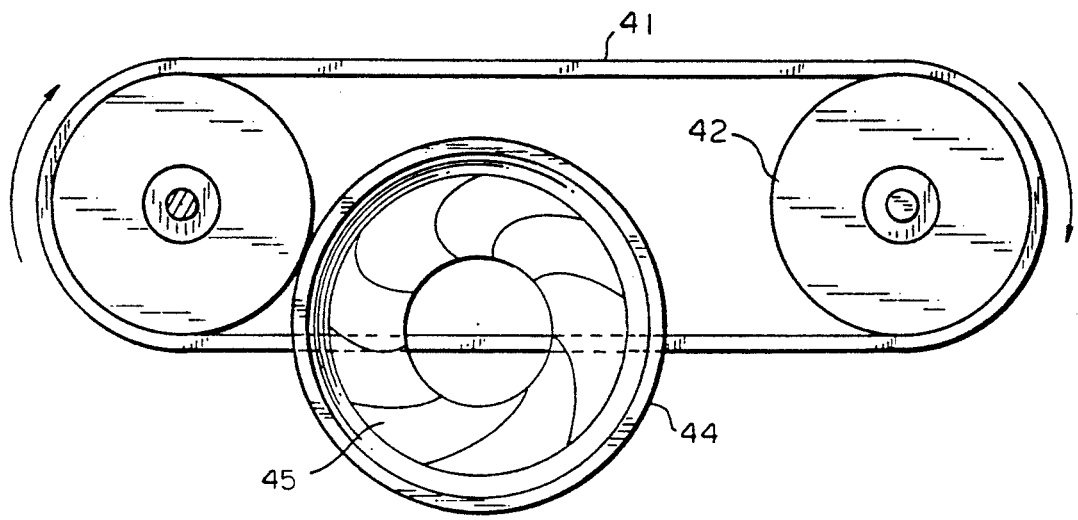
Figure 4D:
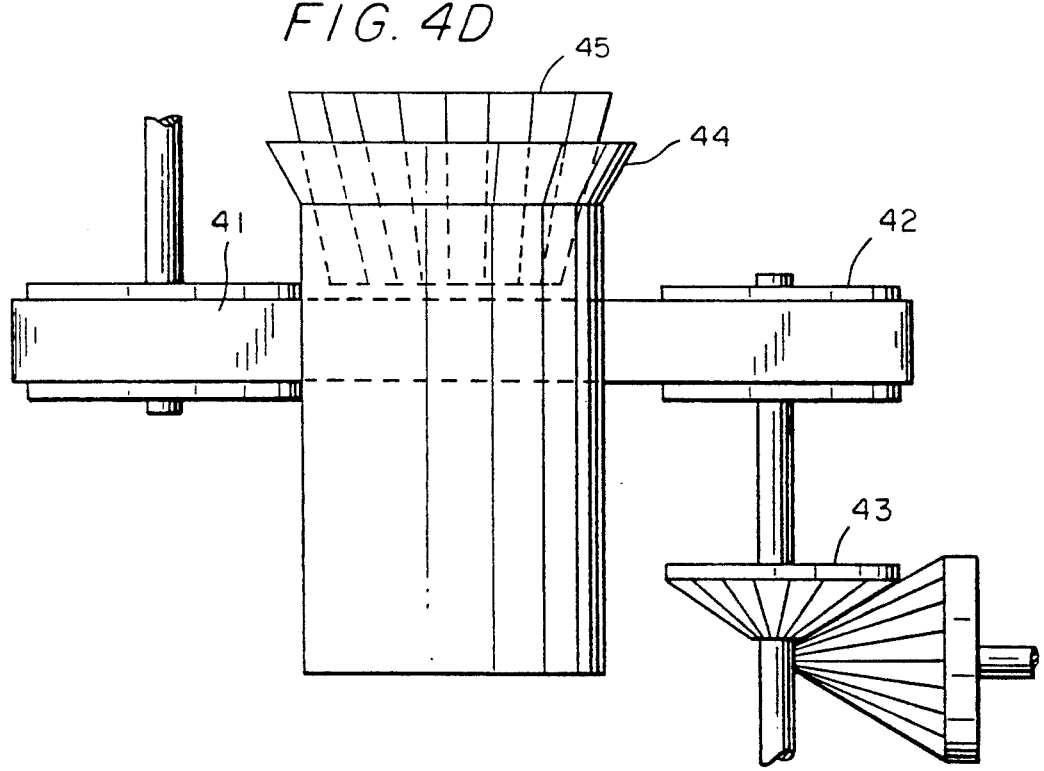

In FIG. 4A at position 44 a flexible frusto-conical guide is placed, in order to pass the diaper by suction directly towards the saw 41. When reaching the saw 41, the diaper is sliced and transferred to the movable clips described below in FIGS. 5A, B, C.

FIGS. 5A, B, C illustrate the movable clips 51. FIG. 5A and 5B demonstrate two views of the clip 51, having a support tube 52 with blocking ring 53 and two diaper grips 54A and 54B, one of them is movable; a spring 55 and a second movable tube 56 are provided inside the support tube 52 and the tube 56 having a smaller diameter than the support tube 52. The second movable tube 56 has at its outer end a ball 57. The movable grip 54A is installed between the first fixed grip 54B and the ring 53 by means of a connecting shaft 58, moving in a groove 59 of the tube 52; and the spring 55 is located between the grips 54A and 54B inside the tube 52. When pressure is applied to the ball 57, the smaller tube 56 will move into the support tube 52 and press the spring 55 by means of the shaft 58 so, that the grips 54A and 54B will close.

Figure 5C:
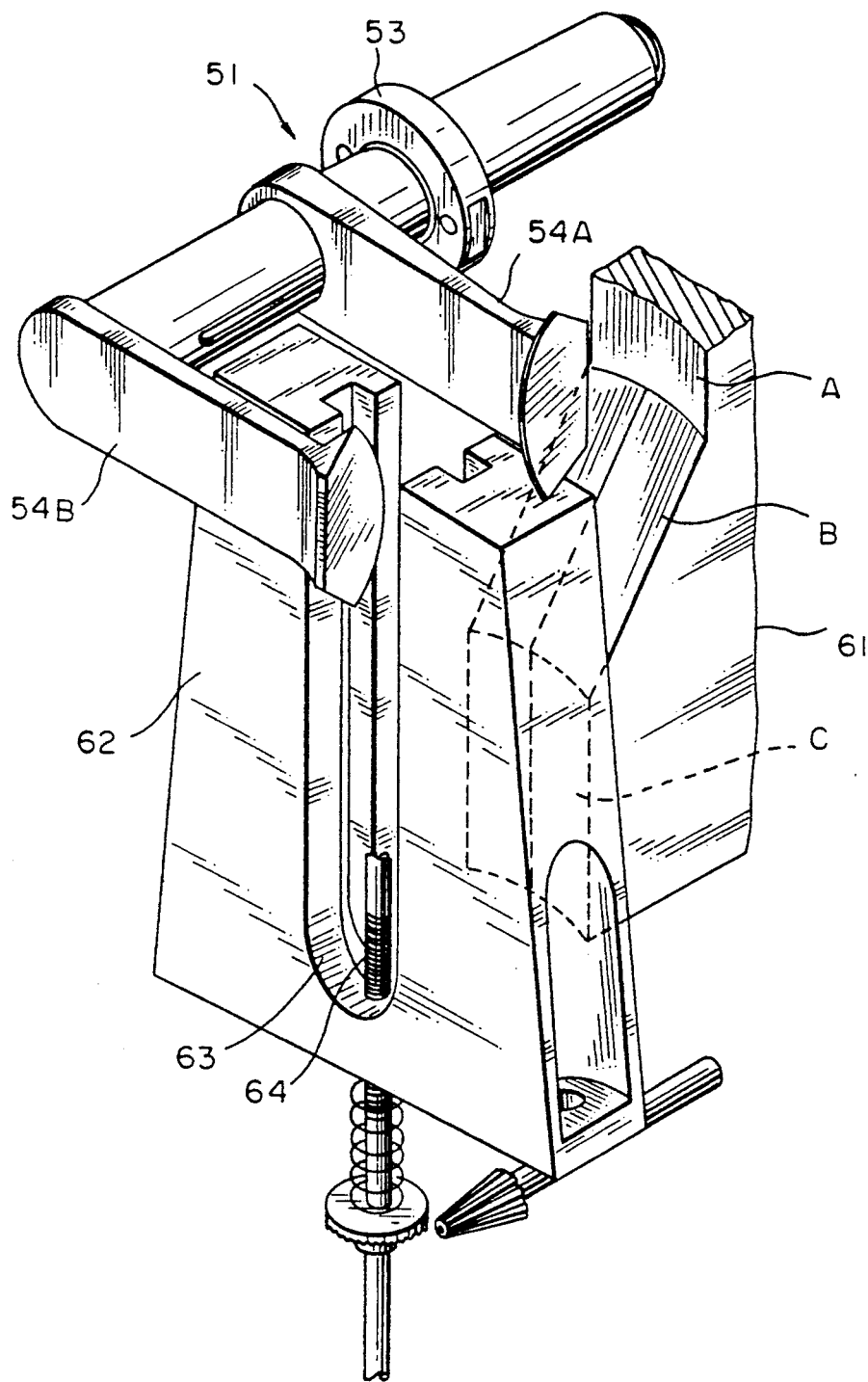
FIG. 5A, B, C illustrate movable clips for holding and moistening of the parts of the cellulose articles after splitting.

FIG. 5C illustrates the clips unit. The unit includes two opposite groups of elements, located above a water basin (not seen), and each group comprises: the movable clips 51; an inclined wall 61, having three sections A, B and C; a partition 62, having a vertical groove 63, where a shaft 64 moves, activated by a motor (not seen). The shaft 64 is connected to the ring 53 of the clips 51.

During the diaper splitting process a sensor (not shown) activates the motor, the shaft 64 moves downwards with the clips 51. The ball 57 roles from the section A to the section B of the wall 61. In the position A the grips 54A and 54B are open, in the position B the grips 54A and 54B close and grab any part of the diaper. From this moment the shaft 64 (activated by a signal of the sensor, not shown) begins to move up and down along the groove 63; and clips 51 with the diaper parts begin to move up and down along the section C of the wall 61 near the water surface in the basin (not seen) till the cellulose flock becomes moist and separates from the plastic cover of the diaper.

Figure 6A:
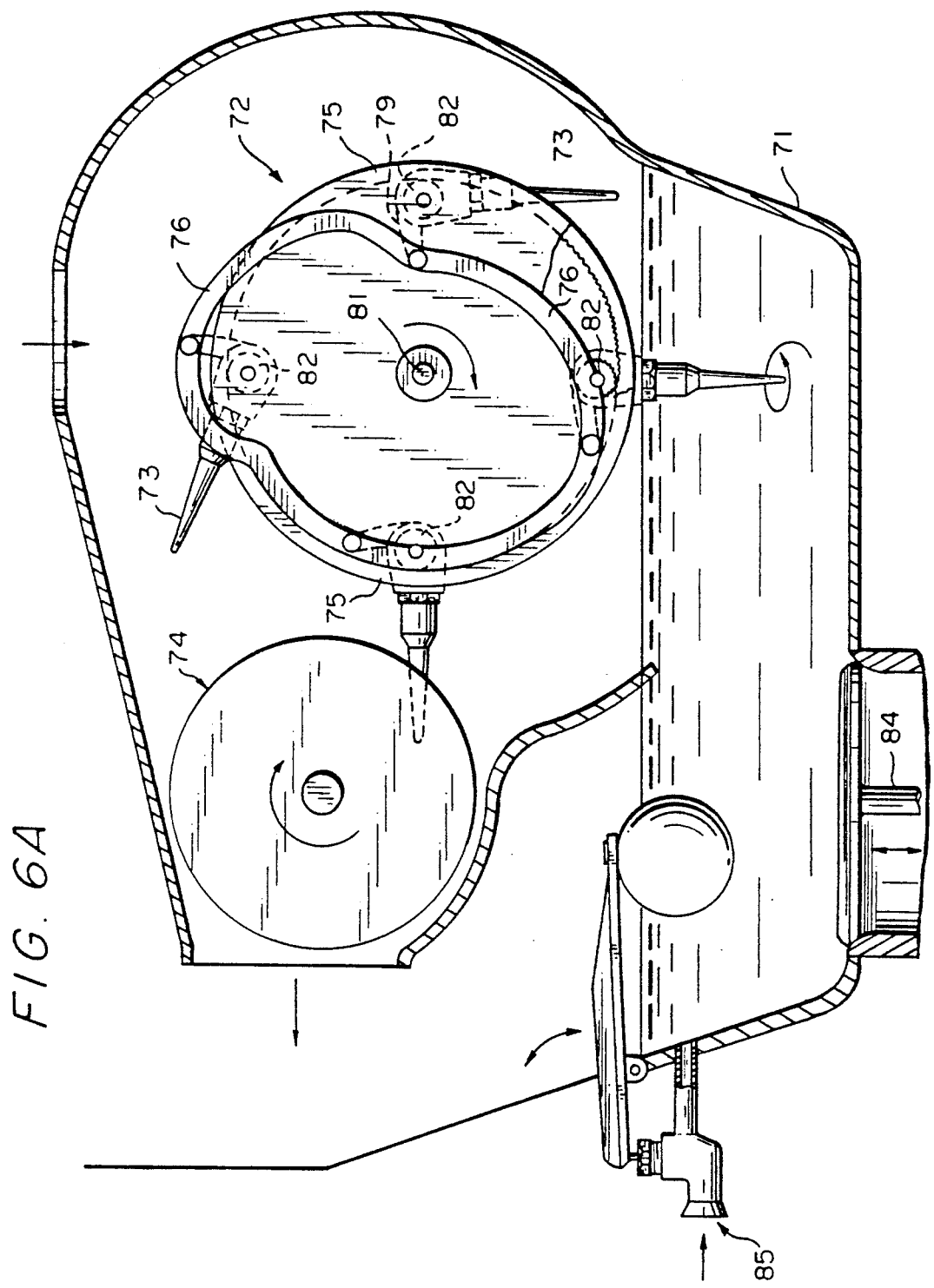
FIG. 6A, B, C(1), C(2) illustrate the cellulose flock collecting unit.

FIG. 6A, B, C illustrate one embodiment for the cellulose flock gathering and unloading processes.

FIG. 6A (is a side view). For the cellulose flock collection from the water basin 71 two major rotating elements are provided above the water surface; one of them is a gathering unit 72, having a plurality of rotating gathering pins 73, and the second element is a doffer 74 for unloading the cellulose fibres from the gathering pins 73. Said two units 72 and 74 rotate in opposite directions to each other. These two major units 72 and 74 are similar to the devices, which are widely used in automatic cotton gathering machines. The gathering unit 72 is provided with a fixed main gear weel 75 and a fixed 8-shaped element 76.

The water, now containing superabsorbent polymers and waste effluent, is discharged from the water basin 71 by pumping means 84 in form of a diaphragm, which is activated by a sensor (not seen). Fresh water is introduced consequently into the water basin 71 through a valve 85.

Figure 6B:
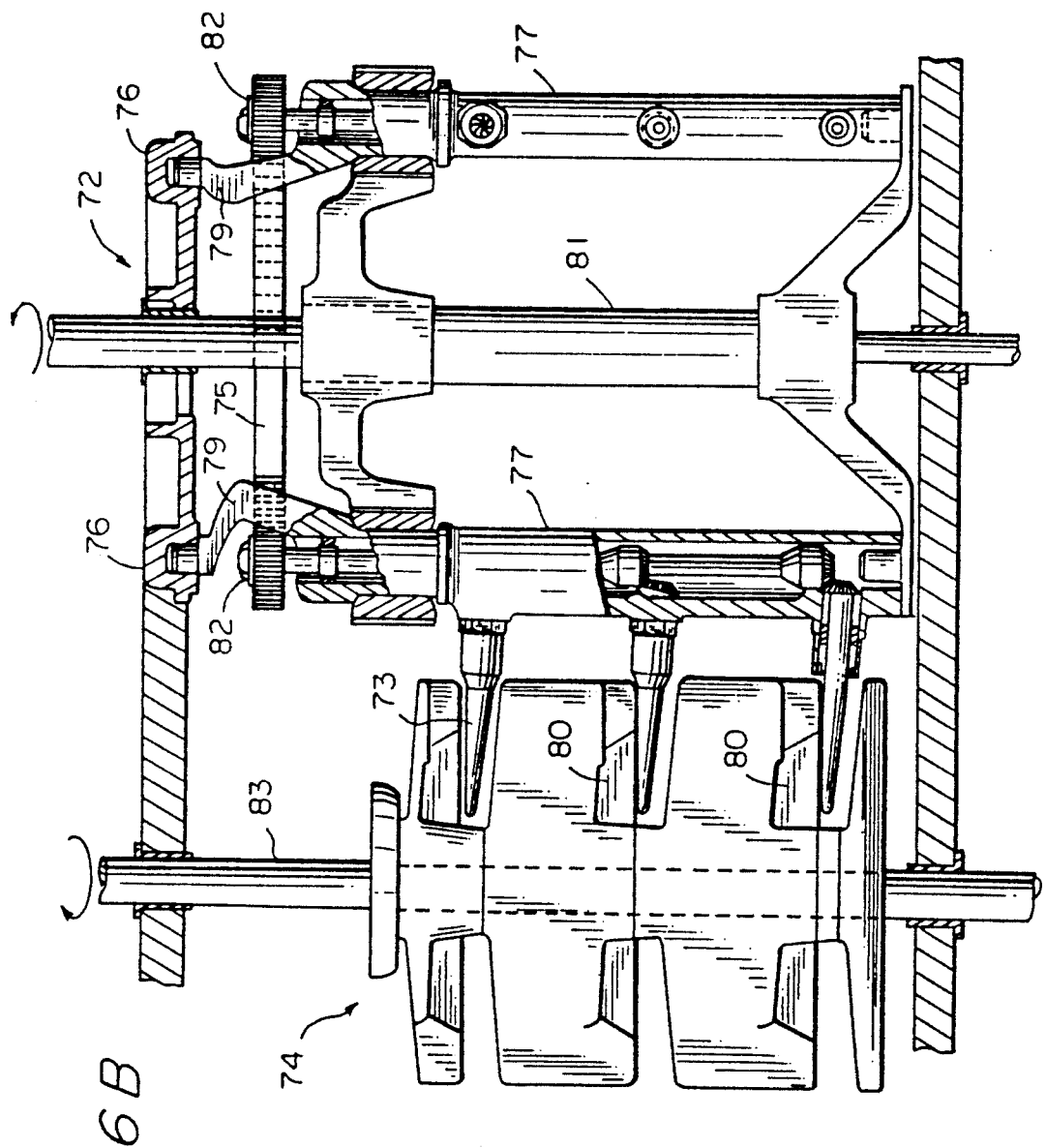
FIG. 6D, E, F, G illustrate an alternative modifications of the cellulose collecting unit.

FIG. 6B is a top view and FIG. 6C(1) is an isometric view of an element of the cellulose gathering unit 72. Combs 77 rotate around a central axis 81 and move along the inner surface of the main gear wheel 75 by means of the engaged gear wheels 82. The combs 77 are provided with rotatable gathering pins 73, covered with small hair-like filaments 78, such as VELCRO TM, [see FIG. 6C(2)]. The pins 73 gather all the cellulose fibers from the water basin 71 in FIG. 6A and simultaneously the pins 73 stir the contents of the water basin 71.

The doffer 74 rotates around an axis 83 and is provided with slots 80 for interacting with the pins 73. The combs 77 are movably attached to the 8-shaped detail 76 by rigid levers 79, in order to obtain the right angle of the pins 73, as they penetrate into the doffer 74 for unloading the cellulose fibers. As a result of the mode of attachment the pins 73 pass the slots 80 of the doffer 74 in the appropriate direction, so that the rubber surfaces of the slots 80 remove the cellulose flock from the pins hair-like cover 78. The cellulose flock is then removed from the slots 80 to the cellulose compacting unit by suction, provided by the blower (not seen).

Figure 6D:
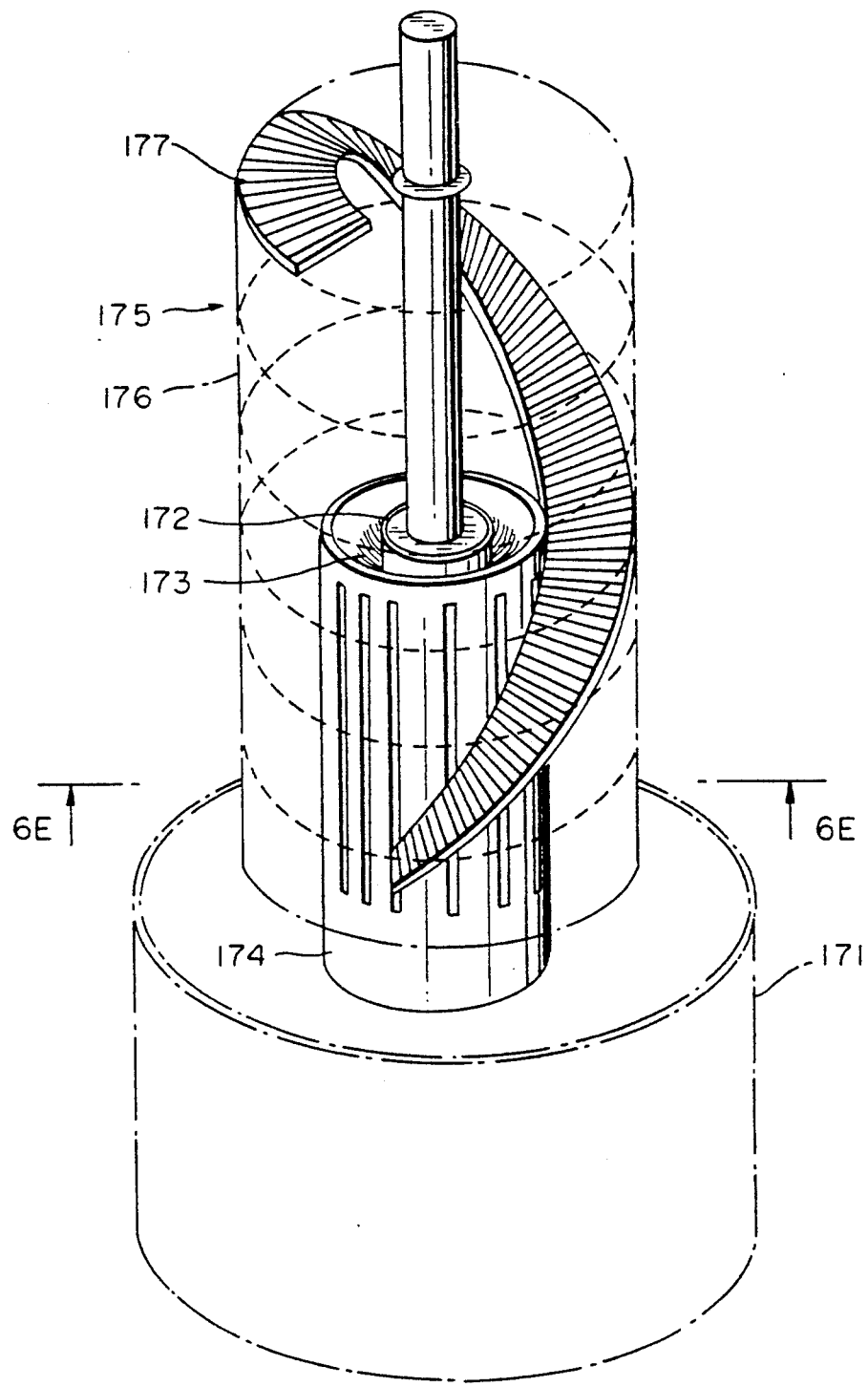

In FIGS. 6D,E,F an alternative embodiment of the collecting unit for removing the cellulose flock from the water basin is shown. The unit comprises a water basin 171; a rotatable cylindrical brush 172, having a plurality of bristle elements 173; a coaxial slotted cylinder 174, embracing the brush 172; and scrapping means 175. The brush 172 and the slotted cylinder 174 are movable in the vertical direction between the water basin 171 and the scraping means 175. In this particular embodiment the scraping means comprise an additional coaxial outer cylinder 176 provided inside with a flexible strip 177 and embracing the slotted cylinder 174 when at its upper position.

Figure 6E:
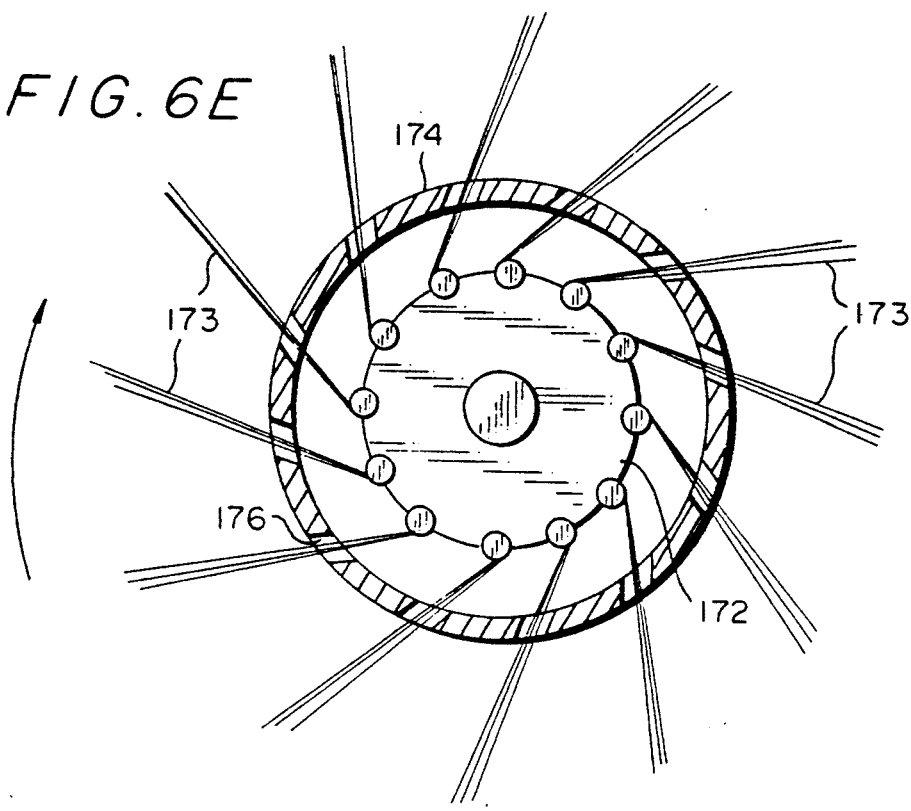

FIGS. 6E,F show the cross section of the slotted cylinder 174 and the brush 172, which are illustrated in FIG. 6D. The bristle's elements 173 are mounted on the brush's base 172 so as to form acute angles to the surface of the base 172. The slotted cylinder 174 is rotatable and vertically movable simultaneously with the brush 172, so that when the slotted cylinder 174 and the brush 172 rotate in the water basin 171, the bristle elements 173 extend out of the cylinder 174 through the slots 176 (see FIG. 6E) and collect the cellulose flock from the water in the basin 171.

Figure 6F:
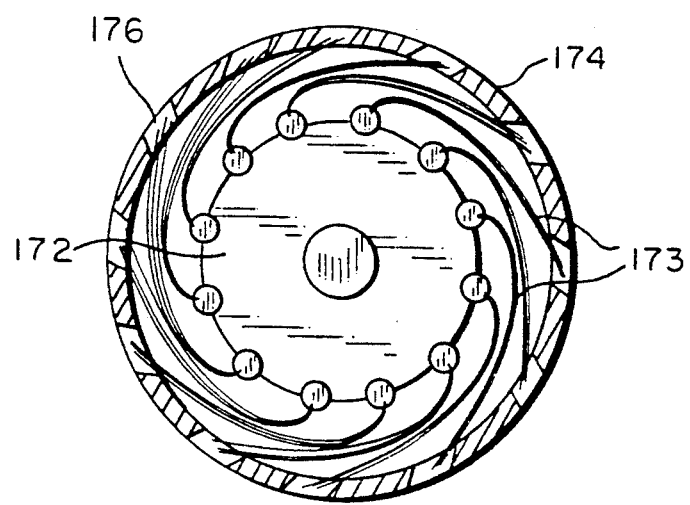

When the brush 172 and the cylinder 174 are raised out of the water basin 171, the rotation of the brush 172 (but not of the cylinder 174) is stopped, and the bristle elements 173 hide inside the rotating slotted cylinder 174 (see FIG. 6F). The cellulose flock then is left on the cylinder's 174 external surface and is further scrapped off by the flexible strip 177 (see FIG. 6D). The scraping means 175 can alternatively be in form of a single movable flexible ring.

Figure 6G:
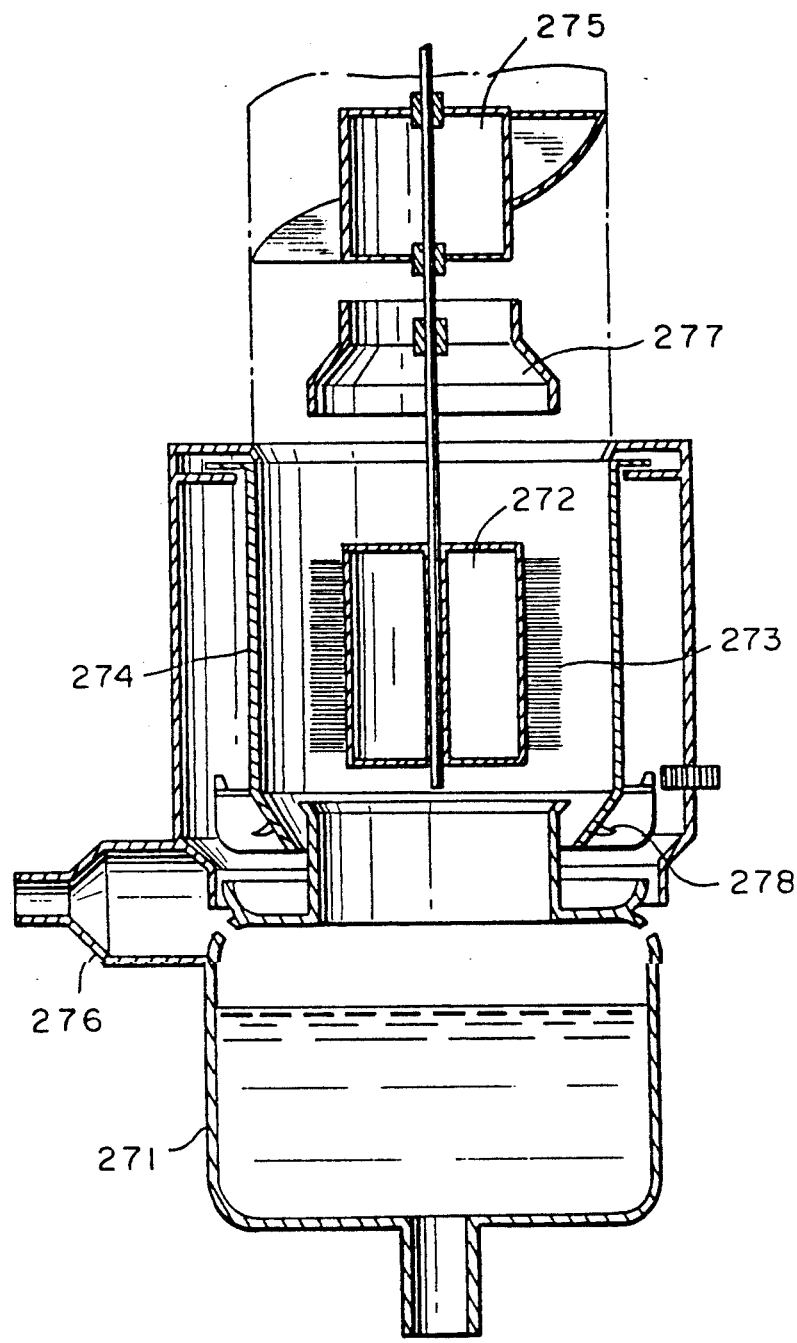

In FIG. 6G an alternative embodiment of the cellulose flock collecting unit is shown. The unit comprises a brush 272 provided with a bristles 273 and is rotatable at two different speed rates and movable up and down; and a rotatable coaxial slotted cylinder 274 having a diameter larger than the diameter of the brush 272.

When the brush 272 rotates at the lower speed while being immersed in the water basin 271, the bristles 273 collect the cellulose flock. When the brush 272 is raised from the water basin 271, it is rotated at the faster speed, and the cellulose flock and water drops are centrifuged from the bristle 273 towards the internal surface of the slotted cylinder 274. The water then flows down to the basin 271, and the cellulose flock is scrapped off from the internal surface of the slotted cylinder 274 by a scrapper 275, and is then transferred out of the unit through a channel 276. A lid 277 is provided to separate the water basin from the scrapper 275. The rotatable slotted cylinder 274 can be additionally provided with a blower 278, in order to create suction.

Figure 7:
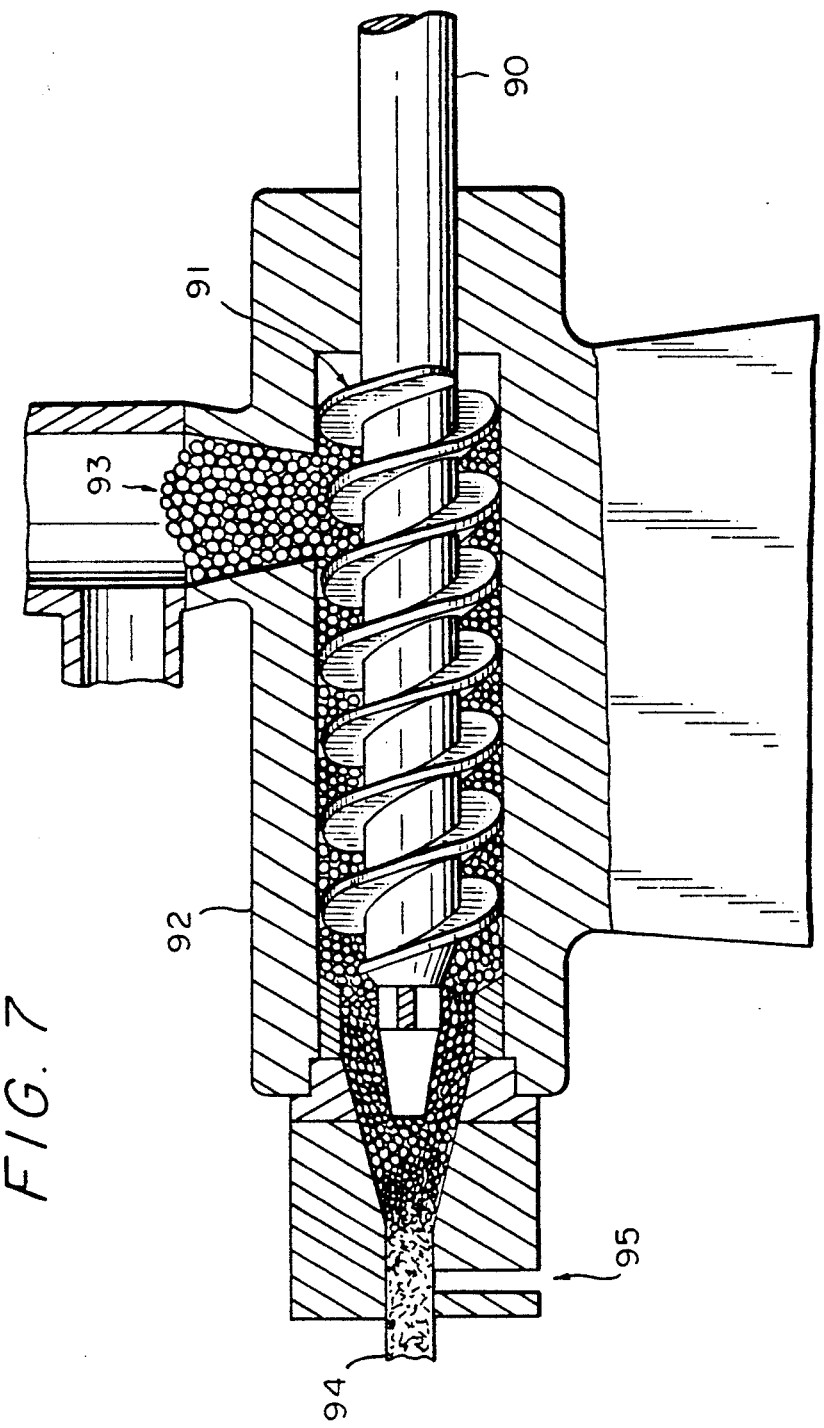
FIG. 7 illustrates the cellulose flock compacting element.

In FIG. 7 the cellulose compacting unit comprises an endless screw 90, moving in a groove 91 of a housing 92. The housing 92 has a cellulose inlet 93, and a narrow outlet 94, provided by a liquid passage 95. When the cellulose flock is drawn into the inlet 93 by suction, the rotating screw 90 compresses the cellulose flock, thus dries it simultaneously.

Figure 7A:
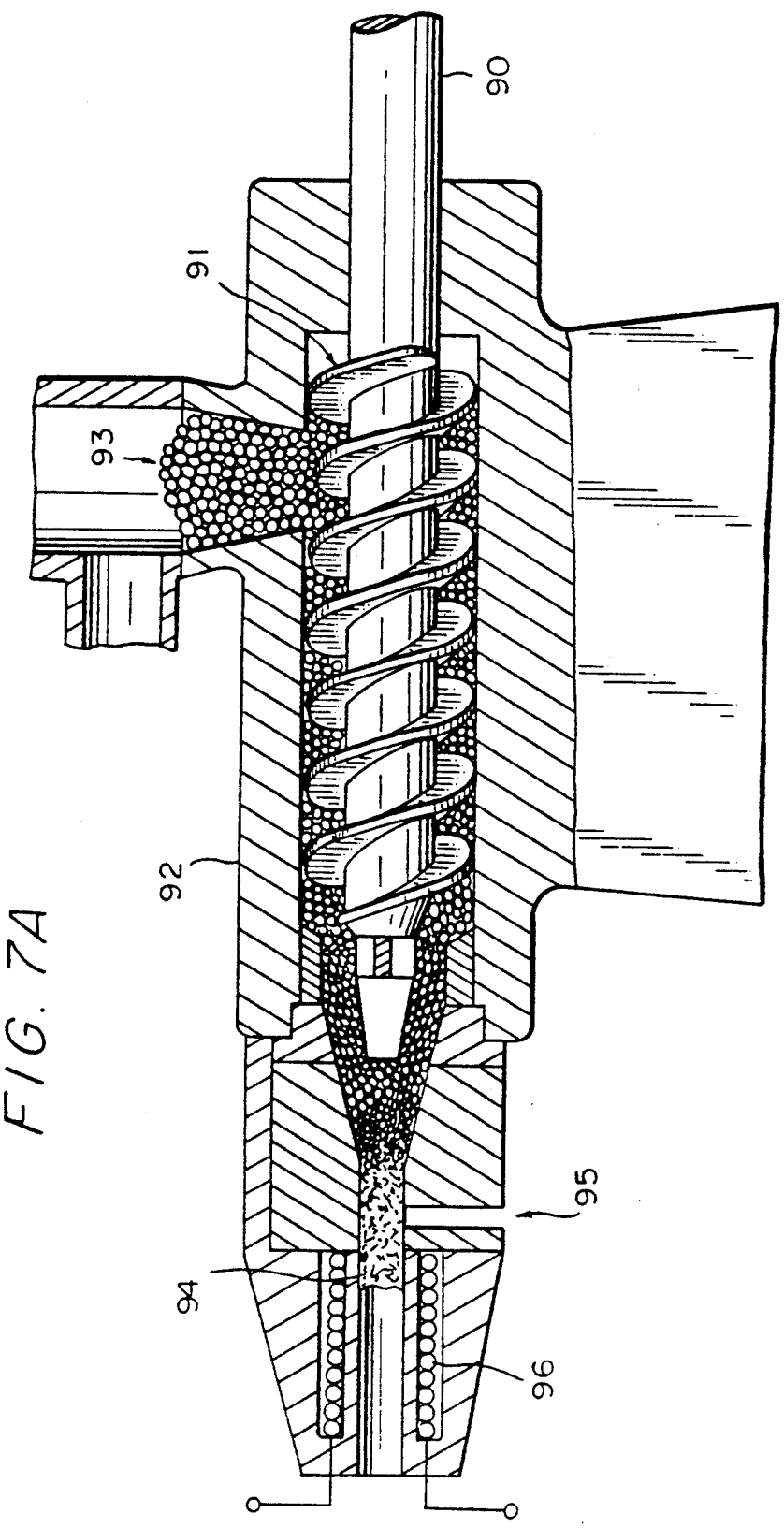
FIG. 7A illustrates the combined heated compacting element.

In FIG. 7A the housing 92 is provided with a heating electrical element 96. Such a heated compacting unit can compress and disinfect the cellulose flock or the plastic cover parts in its outlet channel 95. The mass, situated in the outlet channel 95, which has a diameter of about 25 mm, should be heated in 150° C. for 5 min.

Figure 8:
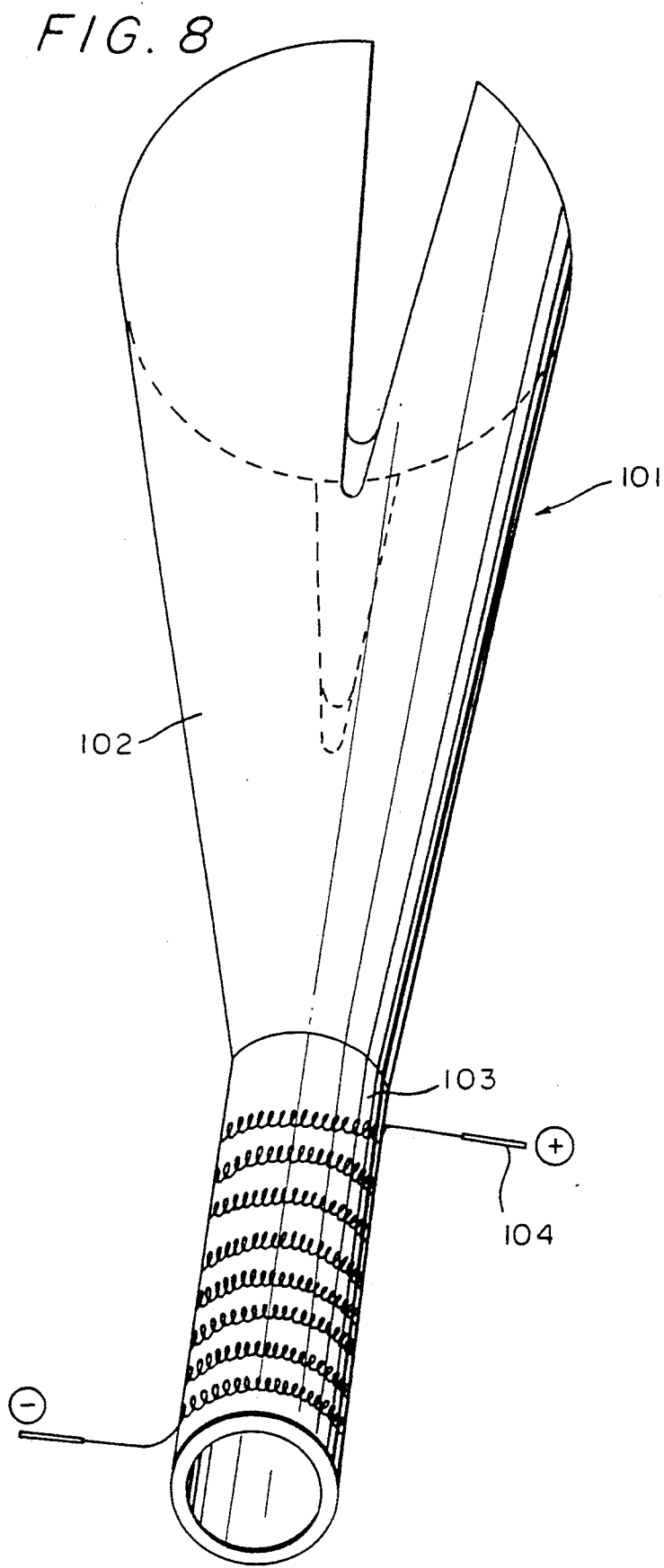
FIG. 8 illustrates a hollowed conical heated element for the processing of the plastic covers of the cellulose articles.

FIG. 8 illustrates the construction of a conical hollowed heated element 101 for processing the plastic stream as it comes off the moving clips (not seen), described in FIGS. 5A,B,C.

The element 101 consists of a conical hollowed receiving part 102, attached to a hollowed cylindrical part 103, coiled by a heating electrical element 104. According to the process illustrated in FIG. 1, the plastic cover parts of the disposable diaper or other cellulose articles are accumulated in the conical part 102 and then melted in the cylindrical part 103 as a result of the heating, caused by the heating element 104. The melted plastic mass is transferred to a cooling unit prior discharge.

Figure 8A:
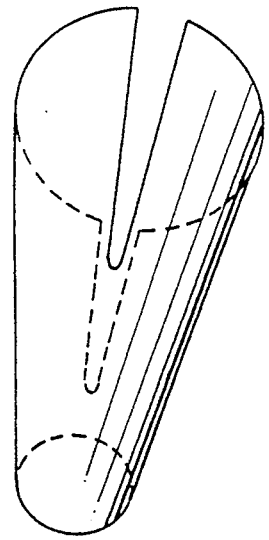
FIG. 8A illustrates a non-heated modification of the hollowed conical element, shown in FIG. 8.

FIG. 8A illustrates a modification of the conical hollowed element, shown in FIG. 8. The modification relates to the process, illustrated in FIG. 1A. The conical hollowed element is not heated and is directly connected by suction to the shredding unit 17A, and then to the cellulose flock compacting heated element 19A (see FIG. 1A).

While the invention has been described in reference to the attached illustrations, it should be appreciated that other machine components could be utilized for the diaper recycling process described above.

What is claimed is:

1. A process for recovering a cellulose flock component of disposable diapers and other non woven cellulose articles having a plastic component and superabsorbent polymers, comprising separating said cellulose flock component from a plastic component of said diapers and cellulose articles to provide a plastic stream and a cellulose stream; disintegrating said cellulose flock component in water, and separating said cellulose flock component from the superabsorbent polymers and other waste effluent by selectively said cellulose flock therefrom onto a rough surface; disposing said superabsorbent polymers and waste in said water as effluent; and compacting said separated cellulose flock prior to discharge.

2. The process as in claim 1, comprising first slicing said diapers and cellulose articles to provide a sliced mass, and wherein said process provides dipping said sliced mass into water and moistening of said sliced mass before separation of said sliced mass into said plastic stream and said cellulose stream.

3. The process as in claim 1, wherein said separation of said cellulose flock from said waste materials is provided in a solution of a disinfectant in water.

4. The process as in claim 1, wherein said compacting of said separated cellulose flock comprises compressing and simultaneous drying and disinfection of said flock by heating thereof.

5. The process as in claim 1, wherein said plastic stream is compacted.

6. The process as in claim 5, wherein said compacting process of said plastic stream is performed by melting, and then cooling.

7. The process as in claim 5, wherein said compacting process of said plastic stream is performed by compressing and heating.

8. Apparatus for recovering a cellulose flock component of disposable diapers and other non-woven cellulose articles having a plastic component and super absorbent polymers, comprising separating means for separating said cellulose flock component from said plastic component of said diapers and cellulose articles; disintegration means for disintegration of said cellulose flock separated from said plastic component, including a water basin; separating means including a collecting unit provided with a rough surface for separating of said cellulose flock from said water basin; compacting means for compacting of said cellulose flock; and disposal means for removal of the liquid effluent from said water basin.

9. Apparatus in accordance with claim 8, further comprising a separating and compacting unit for said plastic component, a safety lid means for safely introducing diapers and cellulose articles into said apparatus, and slicing means for slicing said diapers and cellulose articles upstream of said separating means.

10. Apparatus in accordance with claim 9, wherein said separating and compacting unit for said plastic stream is provided with melting and cooling means.

11. Apparatus in accordance with claim 10, further comprising means for shredding and collecting said plastic material for further discharge.

12. Apparatus in accordance with claim 3, wherein said compacting means for said cellulose flock serves also for compacting of said plastic stream.

13. Apparatus in accordance with claim 9, comprising a housing and wherein said safety lid means comprises a cylindrical body having an orifice through which said diapers and cellulose articles are introduced; and wherein said cylindrical body is attached to a pedal by connecting, raising, turning means for causing said lid to rise over said housing when said diaper or cellulose article is introduced into said orifice and then return into said housing and turn around simultaneously in order to protect the user's hand from any movable parts.

14. Apparatus in accordance with claim 9, wherein said slicing means are placed under said lid and comprise a circulating continuous saw.

15. Apparatus in accordance with claim 14, wherein said slicing further comprises a flexible frusto-conical guide tube for transferring said diapers from said lid towards said circulating continuous saw, said guide tube having a smaller orifice and a larger orifice wherein said smaller orifice faces towards said saw.

16. Apparatus in accordance with claim 9, wherein said separating means comprises movable clip means for holding the plastic cover parts of said diaper and said cellulose articles; said clip means being further for tearing said plastic covers away from the cellulose stream; said separating and compacting unit for said plastic stream including a conical hollowed element; said clip means being further for transferring said plastic stream into said conical hollowed element for compacting and discharging.

17. Apparatus in accordance with claim 16, wherein said movable clip means comprise movable clips and a support tube having two grips, one of them being movable; said support tube is provided inside with a spring, connected to said movable grip; a movable cylindrical body, having at an outer end thereof a rotatable ball, and said movable clip means comprise an inclined wall having three sections of different thicknesses, and driving means for the vertical movement of said clips, so that when said clips are driven downwards, said ball rolls along said wall sections and presses said cylindrical body; and said cylindrical body causes compression of said spring, thus closing and grips, and grabbing a part of said diaper or said other cellulose article; and when said driving means drive said closed clips up and down along one of said surfaces said clips dip said part of said diaper into water to provide moisture from said basin onto said cellulose causing separation of said cellulose flock from said plastic component.

18. Apparatus according to claim 8, wherein said collecting unit of said cellulose flock from said water basin comprises a rotatable element provided with rotatable pins having rough surfaces; a corresponding rotatable doffer, provided with slots for unloading said cellulose flock from said pins; so that when said rotatable pins are loaded with said cellulose flock, said rotating pins interact with said slots of said doffer to release said cellulose flock from said pins, and said cellulose flock is discharged towards said compacting means.

19. Apparatus according to claim 18, wherein said pins are covered with a hard nap cover constituting means for grasping cellulose flock.

20. Apparatus according to claim 8, wherein said collecting unit of said cellulose flock from said water basin is provided with a hard nap fabric on which cellulose flock builds up for subsequent removal.

21. Apparatus according to claim 8, wherein said cellulose flock collecting unit comprises a rotatable cylindrical brush; a coaxial slotted cylinder embracing said brush; and scrapping means; said brush being positioned for immersion and rotation in said water basin for removing said cellulose flock from the water onto said brush's bristle; said brush being raisable from said water basin for unloading said cellulose flock from said bristle.

22. Apparatus in accordance with claim 21, wherein said bristles are mounted at an acute angle to a bristle supporting base of said brush; and said slotted cylinder is rotatable and movable with said rotatable brush; so that when said slotted cylinder rotates together with said brush in said water basin, said brush bristles extend out from said cylinder through said slots and collect said cellulose flock from said water basin; and when said brush and cylinder are raised from said water basin, said brush rotation is stopped while said cylinder continues to rotate thus causing said brush to confine inside said slotted cylinder; and said cellulose flock remains on said cylinder's external surface to be further removed by scrapping means.

23. Apparatus in accordance with claim 21, wherein said scrapping means are in form of an additional coaxial cylinder, provided with a flexible strip and movable relatively to said slotted cylinder.

24. Apparatus according to claim 21, wherein said scrapping means are in form of a movable flexible ring.

25. Apparatus according to claim 21, wherein said brush is able to rotate at two different rates; and said coaxial slotted cylinder has a diameter larger than the diameter of said brush; so that when said brush rotates slowly while being immersed in said water basin, said bristles collect said cellulose flock from said water; and when said brush is raised from said water basin and is rotated faster, said cellulose flock together with the water drops are centrifuged away from said bristles towards the internal surface of said slotted cylinder; and said cellulose flock is scraped off from said internal slotted cylinder's surface.

26. Apparatus according to claim 9, wherein said compacting unit of said cellulose flock comprises a rotatable screw feeder means for compacting said cellulose flock and creating an elevated temperature thus providing disinfection and drying of said cellulose flock.

27. Apparatus according to claim 26, wherein said rotatable screw feeder is provided with heating means.

28. Apparatus according to claim 8, further comprising pumping means for pumping away of said separated superabsorbent polymer and waste effluent remaining in said water basin; and for the consequent introduction of fresh water into said water basin.

29. Apparatus according to claim 8, further comprising a blower means for creating suction for pneumatically transferring of said cellulose articles and their components from one of said units to another.

* * * * *

UNITED STATES PATENT AND TRADEMARK OFFICE
CERTIFICATE OF CORRECTION

PATENT NO. : 5,322,225
DATED : Jun. 21, 1994
INVENTOR(S) : Yaron CINA

It is certified that error appears in the above-indentified patent and that said Letters Patent is hereby corrected as shown below:

Cover Page, line 4 in the Abstract, delete "splicing" and insert therefor --slicing--;

Cover Page, line 6 in the Abstract, delete "spliced" and insert therefor --sliced--;

Column 1, line 41, delete "till 400 times their own volume" and insert therefor --till 100 times their own weight--;

Column 10, line 25, after "selectively" insert --collecting--.

Signed and Sealed this

Eighteenth Day of October, 1994

Attest:

BRUCE LEHMAN

*Attesting Officer*   *Commissioner of Patents and Trademarks*